United States Patent [19]

Rainer et al.

[11] 4,002,177

[45] Jan. 11, 1977

[54] MICROPOROUS STYRENE POLYMERS AND METHOD OF MAKING SAME

[75] Inventors: Norman B. Rainer; Peter Allen Wilson, both of Richmond, Va.

[73] Assignee: Philip Morris Incorporated, New York, N.Y.

[22] Filed: Mar. 6, 1975

[21] Appl. No.: 555,988

Related U.S. Application Data

[62] Division of Ser. No. 282,481, Aug. 21, 1972, Pat. No. 3,887,730.

[52] U.S. Cl. .............................. 131/10 R; 131/269
[51] Int. Cl.² .......................................... A24B 15/00
[58] Field of Search .......... 131/269, 10, 10.3, 10.5, 131/10.7, 10.9, 11, 265

[56] References Cited

UNITED STATES PATENTS 3,574,150   4/1971   Jefferson et al. .............. 131/269 X

FOREIGN PATENTS OR APPLICATIONS 1,272,569   5/1972   United Kingdom ............... 131/265
1,183,498   3/1970   United Kingdom ............... 131/269

*Primary Examiner*—Robert W. Michell
*Assistant Examiner*—V. Millin

[57] ABSTRACT

Microporous styrene polymers are provided having randomly interconnected open network of irregularly shaped pores whose walls consist of cohered spherical particles of the polymer. These microporous styrene polymers are produced by mixing styrene polymer latex with a water-soluble ether, casting, molding, or impregnating the resulting mixture into a fibrous material, heating same to a temperature of from about 80° C to about 120° C and removing the ether.

2 Claims, No Drawings

MICROPOROUS STYRENE POLYMERS AND METHOD OF MAKING SAME

This is a division of application Ser. No. 282,481, filed Aug. 21, 1972 now U.S. Pat. No. 3,887,730.

BACKGROUND OF THE INVENTION

1. Field of Invention

This invention relates to a process for the preparation of microporous styrene homopolymers and copolymers and to the products obtained thereby. In one aspect, the present invention is directed to microporous polymers of styrene having improved microporosity and structure. In another aspect, the present invention is directed to microporous styrene polymers and to articles comprising such polymers. In one of its more specific aspects, the present invention concerns tobacco smoke filters comprising microporous polymers of styrene made according to the process of this invention.

2. The Prior Art

The preparation of articles having microporous structures has received considerable attention in the prior art. Indeed there are several patents which disclose such articles, for various applications, and describe the methods of their preparation. For example, U.S. Pat. Nos. 2,777,824 and 3,055,297 describe the preparation of a synthetic thermoplastic polymer, such as, polyvinyl chloride, having a microreticulated structure by a method which basically comprises sintering a mixture of the resin, a plasticizer (e.g., dioctyl phthalate) and an organic liquid non-solvent for the resin (e.g., xylene) to a temperature at which the resin fuses while the system is under sufficient pressure to maintain the mixture in the liquid phase. Sintering at these conditions is continued until a microreticulated structure is formed and the non-solvent may be removed by heating and/or reducing the pressure. When used for tobacco smoke filtration, these products have not been entirely satisfactory since they frequency do not have the desired degree of uniformity and are not particularly effective in removing the undesirable constituents of the tobacco smoke stream.

U.S. Pat. No. 3,528,433 (Johnson et al.) also describes microporous structures for use in granular form as filter material for cigarettes. According to this patent, a thermoplastic synthetic resin such as polyvinyl chloride is heated together with an organic liquid which is non-solvent for the resin until the resin fuses and again heating is continued under a pressure sufficient to maintain the non-solvent in the liquid phase. The mixture may optionally contain a plasticizer for the resin which, together with the non-solvent liquid, are removed or extracted, after fusion of the resin, by contacting the fused resin with vapors of a second liquid. However, unless proper precautions are exercised, the pore structure of the resulting product will be non-uniform and hence it will not be highly effective in tobacco smoke filtration. Furthermore, when plasticizers are employed, the non-uniformity of the product will be aggrevated by the formation of an impermeable outer skin or sheath thereon.

It is noted from the foregoing description that the synthetic resin is employed as a dispersion of the resin in a non-aqueous liquid which is non-solvent for the resin. However, in a very recent patent, i.e., U.S. pat. No. 3,674,722, issued July 4, 1972 the patentees - who are also applicants of the present application - disclose a method for the preparation of microporous polyvinyl chloride which has improved microporous structure. The process disclosed therein involves the use of a vinyl chloride polymer latex, i.e., an aqueous suspension of vinyl chloride polymer in an organic liquid which is a non-solvent for the polymer. There are several differences in the manner of preparing the microporous structures of this invention from those described in this patent. These differences will become apparent from the ensuing detailed description of this invention.

SUMMARY OF THE INVENTION

In accordance with this invention, polystyrene latex or a latex of a copolymer of styrene with other monomers such as, e.g., butadiene, acrylic acid, 2-(aminoethyl) methacrylate, styrene sulfonic acid, acrylonitrile, N-vinyl-pyridine and N-vinylpyrrolidone, is mixed with a water-soluble ether, the resulting mixture is cast, molded or impregnated into a fibrous material or other porous structure such as an open-celled foam which is then heated to a temperature of from about 80° C to about 120° C for about 1 minute to about 1 hour to form an open-celled porous structure wherein the pores are filled with the ether. If desired, the ether diluent may be removed from the structure by conventional extraction techniques using conventional extractants, in which case the resulting structure will contain air-filled pores.

DETAILED DESCRIPTION OF THE INVENTION

It has now been discovered that microporous polystyrene and microporous copolymers of styrene with butadiene, or other comonomers, can be prepared using a polymeric latex as the starting material, and subjecting the polymeric latex to a series of controlled and critical operations designed to achieve a product having improved microporosity. Thus, polystyrene latex containing from about 10 to about 70 weight per cent, and preferably from about 30 to about 60 weight per cent of polystyrene solids is diluted with a water-soluble ether until the diluted mixture contains from about 5 to about 30 weight per cent dispersed polystyrene solids. The polymeric latex which is employed is preferably of the non-film forming type because film-forming type latices will tend to coalesce to form a non-porous structure.

The ethers which are suitable as diluents in the process of this invention must be water-soluble and must have a boiling point above about 85° C. Typical suitable ethers include: diethylene glycol monoethyl ether, otherwise known in the trade as "Carbitol", ethylene glycol monoethyl ether, otherwise known by the trade name "Cellosolve", diethylene glycol monomethyl ether and ethylene glycol monomethyl ether, known by the trade names of "Methyl Carbitol" and "Methyl Cellosolve", respectively, or mixtures thereof. The ethers which are particularly useful in the practice of this invention are aliphatic and non-cyclic, although, certain aromatic and alicyclic ethers may also be suitably employed. If desired, a mixture of glycol ether may be employed together with a glycol such as propylene glycol, diethylene glycol, and triethylene glycol provided that the glycol content does not exceed about 50 weight per cent of the mixture.

It is important in the present invention that the ether employed be water-soluble, non-solvent for polystyrene (or the styrene copolymer) and be compatible with, i.e., not cause agglomeration of the latex. The ethers which are preferred in this invention conform to the following equation:

$$\frac{P_p - P_e}{M} < 3.5$$

wherein $P_p$ and $P_e$ are the densities of the polymer and the ether, respectively, and M is the viscosity of the ether at 25° C expressed in poises. Thus, when using a polystyrene latex as the starting material this equation may be expressed as:

$$\frac{1.06 - P_e}{M} < 3.5$$

where 1.06 represents the density of the polystyrene.

The following table illustrates the applicability of the foregoing equation to several ethers which are useful as diluents for polystyrene latex in the practice of this invention.

TABLE

| Liquid Ether | Boiling Point, °C | Specific Gravity | Viscosity in cps. | 1.06-Pe — |
|---|---|---|---|---|
| Methyl Cellosolve | 124° | 0.97 | 3.2 | 2.81 |
| Cellosolve Solvent | 135° | 0.93 | 4.0 | 3.25 |
| Butyl Cellosolve | 170° | 0.90 | 5.0 | 3.20 |
| Methyl Carbitol | 193° | 1.03 | 5.7 | 0.53 |
| Carbitol | 200° | 1.03 | 8.5 | 0.35 |
| Butyl Carbitol | 225° | 0.96 | 7.5 | 1.33 |
| Triethylene Glycol | 290° | 1.13 | 36 | −0.18 |
| Diethylene Glycol | 245° | 1.12 | 30 | −0.19 |

After diluting the polystyrene latex as aforesaid, the dispersion mixture is placed in a mold or cast in the form of a flat sheet, or is impregnated into a paper and the resulting mold, cast sheet or impregnated paper is then heated to a temperature of from about 80° C to about 120° C for about 1 to about 50 minutes to obtain the desired product. During the heating cycle, especially while the dispersion mixture is still in the liquid state, it is preferred to maintain quiescent conditions throughout the dispersion mixture. For molding of massive objects without confinement under pressure, one may, if desired, remove the water at lower temperature (at reduced pressure) prior to the heating step.

The following examples will further illustrate this invention.

EXAMPLE 1

Ninety grams of diethylene glycol monoethyl ether was added slowly to 20 grams of a polystyrene latex containing 50% solids while the mixture was stirred continuously. The resultant mixture was a homogeneous milky-white dispersion. This mixture was applied to a tissue paper having a porosity of 6 seconds as measured by the Greive method, by immersing the paper in the dispersion and then permitting excess dispersion to drip off while hanging vertically. The impregnated paper was then suspended from a glass rod across the top of the beaker and was heated at 100° C for 30 minutes. The treated paper was then washed with water and then dried. The resultant paper was considerably more opaque and white than the untreated paper and it was porous and exhibited high absorbtivity for oil.

Photomicrographs of a treated paper sample made according to this example taken at 160X magnification at different points of the treated paper, revealed the presence of microporous deposits filling the spaces between cellulosic fibers of the paper.

It is also possible to use a polystyrene latex wherein the individual polymer particles have been colored by absorption of an organic dye. Papers treated by the process of this invention using such colored latices become durably pigmented with the polymer.

EXAMPLE 2

Ninety grams of diethylene glycol monoethyl ether was added to 25 grams of a polystyrene latex to form a dispersion containing 10% polystyrene solids. A sample of this dispersion was placed in a sealed Carius tube and was heated in an oven at 100° C for about 60 minutes while maintaining the tube therein in a horizontal position. After this heating period the material in the tube had sintered into a rod.

The tube was thereafter removed from the oven and cooled to room temperature. The sintered rod was removed from the tube, diced into chips and washed with water. These chips were then ground in a Waring blender employing sufficient water to form a thin slurry. The slurry was sieved with the aid of a flowing stream of water to obtain 40/80 mesh granules. A photomicrographic examination of a washed and dried chip revealed a porous structure, and the granules, when examined microscopically at 100X amplification, were found to have some degree of ciliation. These granules were also determined to have pore volume greater than 3.4 cc/g and their average pore diameter was 0.6 microns, as determined via a Mercury Intrusion Porosimeter.

When tested for tobacco smoke filtration, these granules showed 65% removal of total particulate matter (TPM) with a 75 mg. loading at 5 inch resistance-to-draw (RTD). This test was carried out in accordance with the standard test method described in the Journal of the Association of Official Agricultural Chemists, Vol. 47, No. 2, April 1964, pp. 356.

EXAMPLE 3

Seven and one-half grams of polystyrene latex was diluted with 17 grams of diethylene glycol monoethyl ether to obtain a dispersion containing 15 weight per cent of the solid polymer. A sample of this dispersion was placed in an open petri dish to a depth of about 3 mm. layer and heated in an oven at 90° C for a 40-minute period, after which the dish was removed from the oven and cooled to room temperature. After this period, the material had sintered into a microporous sheet. This sheet was washed with water to remove the ether and then dried. The resulting sheet was strong and flexible and had an average effective pore size of 5 microns as determined by the filtration of dispersions having known particle sizes.

EXAMPLE 4

The method of Example 3 was followed except that the diluent was an equal mixture of diethylene glycol monoethyl ether and propylene glycol and the resulting dispersion contained 20 weight per cent solid polymer. The resulting sheet was microporous and was found to be useful as a filter.

EXAMPLE 5

The method of Example 3 was followed again except the diluent was an equal mixture of diethylene glycol monoethyl ether and propylene glycol and the latex was a copolymer of styrene with butadiene containing 80 weight per cent of styrene. The mixture was diluted to a dispersion containing 20 weight per cent solid copolymer. The resulting sheet in this example was microporous, had excellent strength, and its effective filtration pore size was between 0.1 and 0.5 micron.

As shown in Examples 1–5, both homopolymers of styrene as well as copolymers of styrene latices can be employed in the process of this invention. When using copolymers of styrene, the comonomer may be butadiene, acrylic acid, 2-(aminoethyl) methacrylate, styrene sulfonic acid, acrylonitrile, N-vinylpyridine and N-vinylpyrrolidone. Moreover, the styrene monomer content of the copolymer must range from about 70 to about 98, preferably from about 80 to about 90 weight per cent of the copolymer.

As is evident from the foregoing examples, the microporous products of this invention find particular usefulness as a tobacco filter material for effective tobacco smoke filtration. It has also been found, however, that a paper impregnated with microporous polystyrene produced in accordance with this invention is heat sealable to form bags, envelopes, containers and packages without the application of glue or other adhesive materials. Furthermore, the microporous polystyrene of this invention may be chemically treated by known methods to produce polystyrene having ion-exchange characteristics.

What is claimed is:

1. A tobacco product comprising a tobacco section and a filter section, said filter section comprising a microporous styrene polymer having a randomly interconnected open network of irregularly shaped pores having their walls defined by cohered spherical particles, an average pore size of less than about 20 microns and a pore volume of at least about 1 cubic centimeter per gram, said polymer being in the form of ciliated granules and having a mesh size of from about 40 to about 80 and said filter section being capable of removing 65 per cent of the total particulate material contained in tobacco smoke passing therethrough at a resistance to draw of the tobacco product of about 5 inches of water and said filter section being found characterized by the substantial absence of any bonding agents.

2. A tobacco product as in claim 1 wherein said microporous styrene polymer is a copolymer of styrene with a monomer copolymerizable with styrene.

* * * * *